Jan. 30, 1962   F. Z. FOUSE   3,018,889
GAUGING MACHINE
Filed Oct. 11, 1956   3 Sheets-Sheet 1

INVENTOR
FREDERICK Z. FOUSE
BY
Norman R. Holland
ATTORNEYS

Jan. 30, 1962  F. Z. FOUSE  3,018,889
GAUGING MACHINE

Filed Oct. 11, 1956  3 Sheets-Sheet 2

INVENTOR
FREDERICK Z. FOUSE
BY
Norman N. Holland
ATTORNEYS

Jan. 30, 1962  F. Z. FOUSE  3,018,889
GAUGING MACHINE
Filed Oct. 11, 1956  3 Sheets-Sheet 3
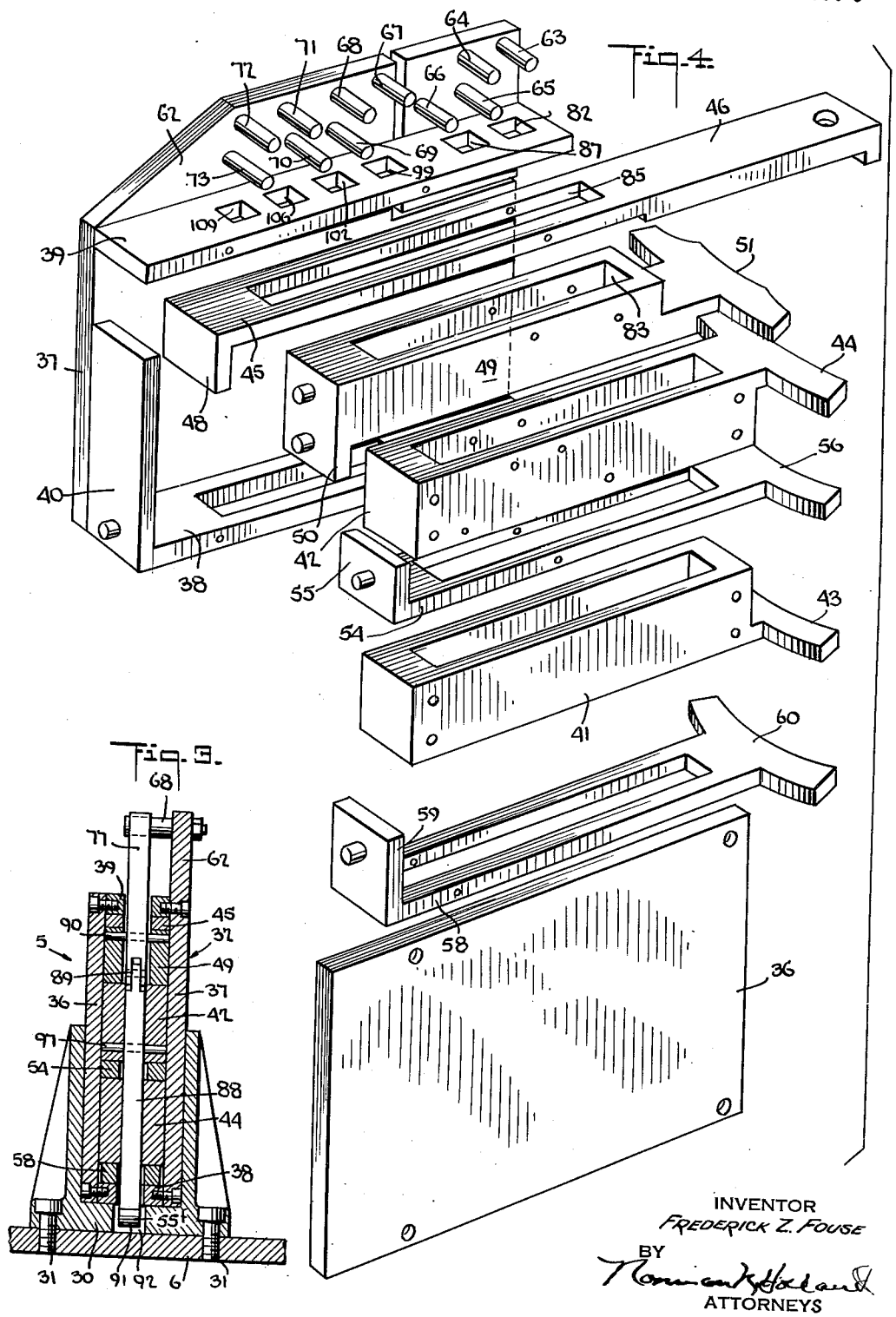
INVENTOR
FREDERICK Z. FOUSE
BY
ATTORNEYS United States Patent Office 3,018,889
Patented Jan. 30, 1962

3,018,889
GAUGING MACHINE
Frederick Z. Fouse, Lancaster, Ohio, assignor to Anchor Hocking Glass Corporation, Lancaster, Ohio, a corporation of Delaware
Filed Oct. 11, 1956, Ser. No. 615,306
15 Claims. (Cl. 209—88)

The present invention relates to a machine for gauging articles such as glass bottles and jars, and more particularly to an improved machine which will gauge the articles as they pass through the machine and automatically discard defective ones.

In the manufacture of glass containers, it is not possible, with modern machinery, to have them conform to a true standard of size, height, and roundness. Permissible variations in the dimensions are set up in the industry and commercial articles come within the ranges given and the glass factory discards those outside the ranges. Closures for sealing containers likewise have standards and will properly seal containers within the commercial range set up. If the containers are beyond that range, defective seals result and the product packed spoils. The value of the product may be many times that of the container and closure. In addition, if a housewife obtains a spoiled package, it hurts the reputation of the manufacturer.

The practice heretofore has been to have girls inspect the containers as they leave the lehrs or to pass them through inspection machines, such as shown in the Harry E. Stover Patent No. 2,570,729 and to weigh and gauge containers from time to time to be sure that the fabricating machines were in operating order. The procedure, particularly the gauging, was more or less hit or miss and frequently substantial quantities of containers were shipped which had a sufficiently high percentage of defective containers to prevent their commercial use. In such cases, selections have to be made in the packer's plant to discard the defective ones or else the shipment has to be discarded.

An object of the present invention is to provide a machine for automatically gauging each container at several critical points as a line of containers is passed through it.

A further object of the invention is to provide a machine which will automatically gauge glassware and discard defective ware.

A further object of the present invention is to provide a gauging apparatus which will automatically gauge the height, diameter, finish, offset-finish and the side walls of a glass article simultaneously and which will discard those articles which do not come within permissible tolerances.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 3 is a sectional end view taken along line 3—3 of FIG. 2 showing the relative positions of the component parts of a gauging unit; and FIG. 4 is an exploded perspective view of a gauging unit showing the arrangement of the parts before assembly.

Figure 1:
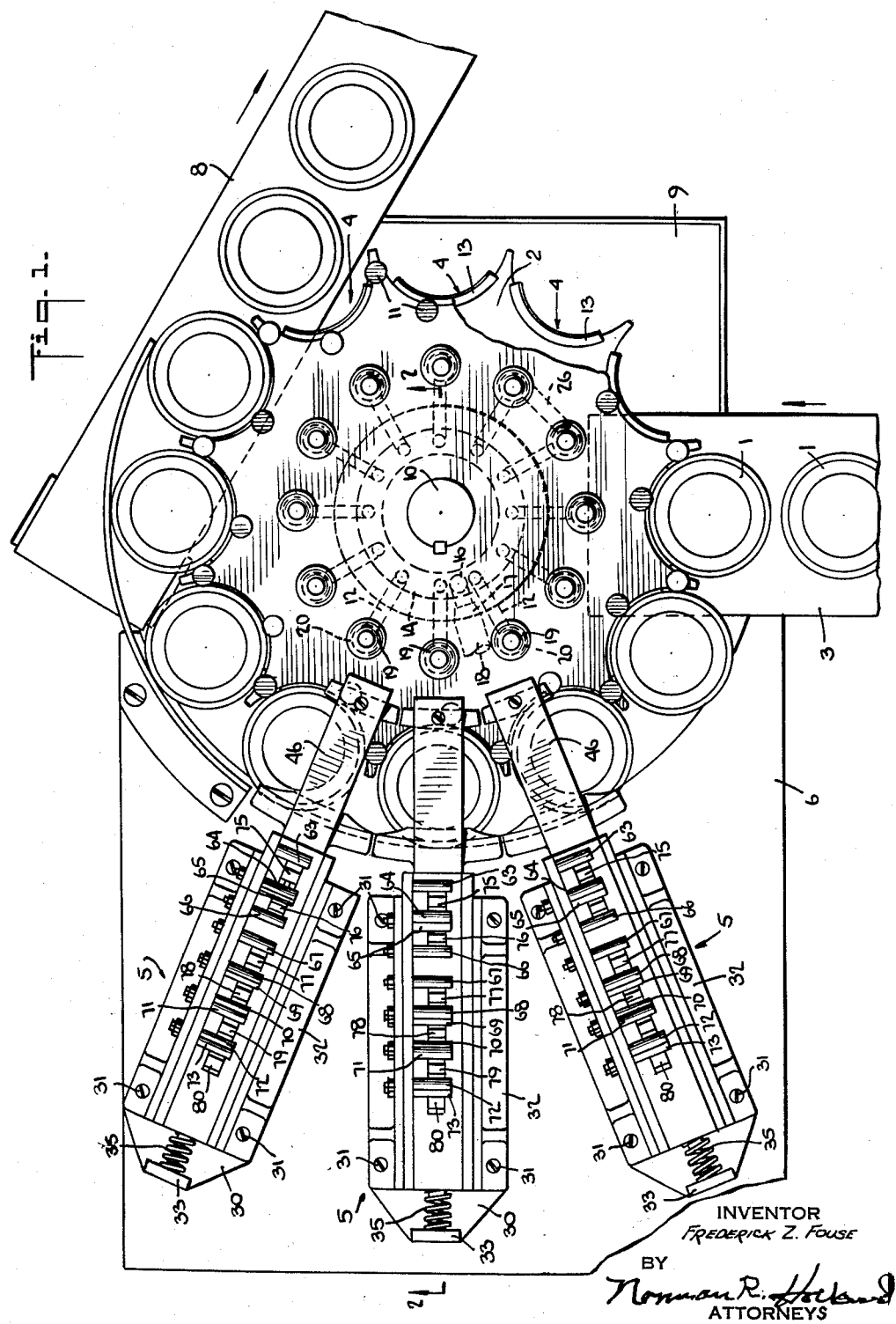
FIG. 1 is a partly broken away plan view of the gauging apparatus of the present invention showing the automatic gauging units inspecting containers.

The method of gauging glass containers will first be described generally with reference to FIG. 1 and the details of construction will be discussed under separate headings.

*General description*

A plurality of containers 1 are fed one-by-one to a rotating pocket wheel 2 by a conveyor 3 which has received the containers from a lehr (not shown) in a manner well known in the art. The containers 1 are lodged in the pockets 4 of the pocket wheel 2 and are moved past gauging units 5 to be inspected thereby. The gauging units 5 are provided with a plurality of engaging fingers which come into contact with each container to determine whether the dimensions of the container are within predetermined tolerances. Each container is rotated as it moves past the gauging units 5 so that all parts of the container will be gauged by the gauging fingers. The containers are rotated at such speeds that in moving past one of the gauging units, they will be rotated only a third of their circumferences. Therefore, three gauging units 5 are provided to permit the complete circumference of the containers to be gauged by the gauging fingers.

If the dimensions of a glass container 1 are within the permissible tolerances, the container will be placed on a take-off conveyor 8 which will convey the container to a packaging station (not shown). However, if the dimensions of a container are beyond the permissible tolerances, a vacuum will be created in the pocket 4 of pocket wheel 2 which will retain the defective container 1 in the pocket 4 and move it past the take-off conveyor 8 and over a suitable receptacle 9 at which time the vacuum which holds the container in the pocket 4 will be broken, thereby releasing the container and permitting it to drop out of the pocket 4 and into the receptacle 9.

*Pocket wheel construction*

Figure 2:
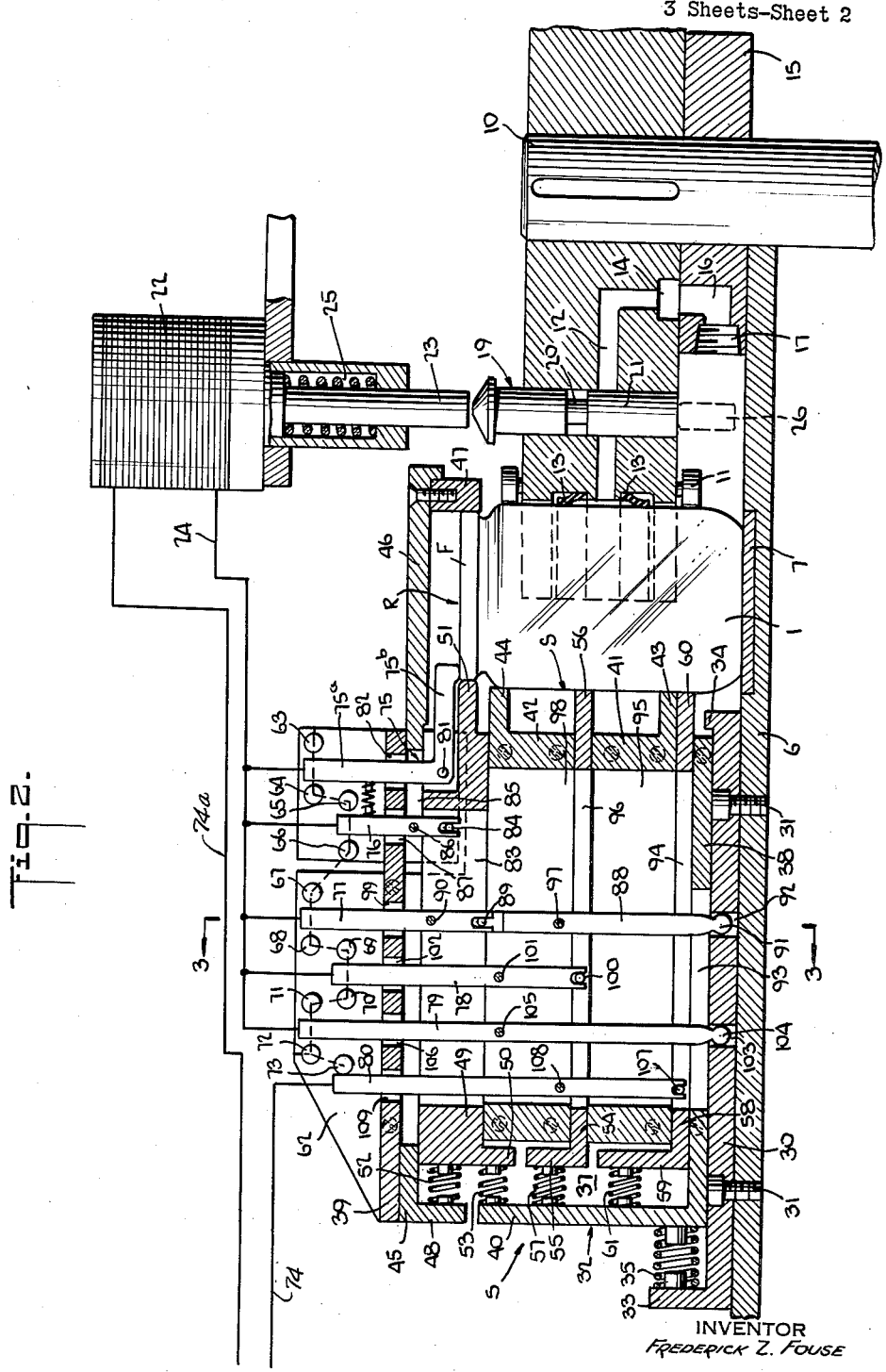
FIG. 2 is a sectional side view taken along line 2—2 of FIG. 1 showing the feeler fingers of a gauging unit in position to gauge a glass container.

The pocket wheel 2 for moving the containers 1 past the gauging units 5 is best illustrated in FIGS. 1 and 2. It comprises a wheel 2 splined to a rotating shaft 10 and provided with a plurality of pockets 4 for receiving the containers 1 and moving them past the gauging units 5.

As they move past the gauging units 5, the containers 1 rest on a base 6 (FIG. 2) which extends from the gauging units 5 toward the rotating shaft 10. To permit the containers to rotate in pockets 4, the base 6 is provided with a smooth disc 7 upon which containers 1 rotate. As the container 1 is engaged by the gauging units 5, friction contact with the gauging units 5 will cause the containers to rotate. To facilitate rotation of each container 1, each pocket 4 is provided with a plurality of rollers 11 (FIG. 2) against which each container rotates.

In order to retain a defective container in pocket 4 until it is to be discarded, the pocket wheel 2 is provided with a plurality of air pressure conduits 12 (FIG. 2). Each conduit 12 communicates at one end with the pocket 4 and at its other end with an enlarged air channel 14. Each pocket 4 is provided with a pair of rubber washer-seals 13 above and below the pressure conduit 12 adapted to be in abutment with the container 1 in pocket 4 so that when the pressure conduits 12 are in operation, air will be removed from between the washer-seals 13 to create a vacuum therebetween which will hold a rejected container 1 in the pocket 4 until it is to be discarded.

To reduce the pressure in the pockets 4 and thereby create a vacuum, a collar 15 (FIG. 2) is fixedly mounted below the pocket wheel 2 and is provided with an air orifice 16 communicating with the pressure conduits 12 through the air channel 14. The pressure orifice 16 has an inlet 17 therein to which a vacuum line 18 (FIG. 1) can be attached to draw air from the pockets 4.

In order to create the vacuum for retaining a rejected container in its pocket 4, a plurality of valves 19 are mounted in the pocket wheel 2 to intersect each pressure conduit 12. Each valve 19 has a reduced neck portion 20 and is movable from a normally raised vacuum-shutting position to a lowered vacuum-creating position. When the valve 19 is in its raised vacuum-shutting position, as shown in FIG. 2, the reduced neck 20 is above pressure conduit 12 and the valve body 21 is completely blocking the pressure conduit 12 so that no air is withdrawn from the pockets 4. When a defective container is received in the pocket 4 of pocket wheel 2, the valve 19 is lowered to place the reduced neck 20 thereof in the path of pressure conduit 12 thereby permitting air to be withdrawn from pocket 4 to create a vacuum which holds the defective container 1 in the pocket 4. When the defective container is to be discarded, the valve 19 is raised to break the vacuum and thereby permit the container 1 to drop out of the pocket 4 and into a suitable receptacle 9 (FIG. 1).

In order to lower the valve 19 to create a vacuum for retaining a defective container 1 in the pocket 4, a solenoid 22 is mounted in front of each gauging unit 5 with its armature 23 overlying the valve 19. The solenoid 22 is electrically connected to a power source (not shown) and to the gauging units by means of the wires 24. When a container 1 is inspected by the gauging units 5 and found to be defective, the solenoid 22 will be energized and its armature 23 will be thrust downwardly against pressure valve 19, to lower the valve 19 and place the reduced neck 20 of valve 19 in the path of pressure conduit 12 to permit pressure in the pockets 4 to be reduced and thereby create a vacuum which will retain the defective container in the pocket 4. When the solenoid is de-energized, the armature 23 will be raised by a spring 25 but the valve 19 will remain lowered. In order to raise valve 19 to break the vacuum and permit the defective container to drop out of the pocket 4, a stationary cam 26 is provided beneath the pocket wheel 2 adjacent the defective ware receptacle 9 (FIG. 1) and located in the path of the lowered valve 19. When the valve 19 strikes the cam 26, the valve 19 will be raised to the shut-off position shown in FIG. 2 to thereby break the vacuum and permit the defective container 1 to drop out of the pocket wheel 2 and into the receptacle 9.

If the containers in the pocket wheel 2 are not defective, the solenoid will not be energized and valve 19 will remain raised so that no vacuum is created and the containers 1 are permitted to be placed by pocket wheel 2 on to the take-off conveyor 8.

*Gauging unit construction*

The gauging units 5 which inspect each of the containers 1 are best shown in FIGS. 2, 3, and 4. Each gauging unit 5 comprises a carrier holder 30 (FIG. 3) mounted on the stationary base 6 by means of bolts 31 and a gauging finger carrier 32 which carries the gauging fingers slidable within the carrier holder 30 between an upstanding rear stop 33 and a front stop 34 on the carrier holder 30. Interposed between the rear stop 33 of carrier holder 30 and the gauging finger carrier 32 is a spring 35 which urges the gauging finger carrier 32 toward the container 1 in the pockets 4 of the pocket wheel 2 to permit its gauging fingers to abut the container 1 to be gauged and to gauge its diameter, as will be more fully described below.

The gauging finger carrier 32 comprises a pair of side walls 36 and 37, a bottom wall 38, a top wall 39 and a rear wall 40 (FIGS. 3 and 4). As will be seen more fully in FIG. 2, fixedly mounted on the gauging finger carrier 32 between side walls 36 and 37, is a stationary body diameter gauging finger 41 to inspect the diameter of a container and a stationary offset finish gauging finger 42 (FIG. 2) to inspect the radial distance between the container finish F and the side walls S of the container 1, hereinafter called the offset-finish. The stationary body diameter gauging finger 41 and the offset-finish gauging finger 42 have curved feelers 43 and 44 extending respectively therefrom which are adapted to engage the container 1 and gauge its diameter and its offset-finish. If the diameter of container 1 is beyond the permissible tolerances or if the distance between the finish and side walls of the container 1 is beyond the permissible tolerances, the feelers 43 and 44 will energize the solenoid 22 to lower valve 19 and create a vacuum in the pocket 4 which will retain the defective container therein until it is to be discarded.

Fixedly mounted on the gauging finger carrier 32 adjacent its top wall 39 is a stationary container-locating finger 45 having an extension 46 protruding over the container 1 with a depending feeler 47 adapted to engage the container finish F on the side opposite that engaged by the other feelers to locate the container 1 relative to the gauging unit 5 for proper gauging. The container-locating finger 45 also acts as a finish-inspecting finger, as will be more fully described hereinafter. The container-locating finger 45 has a rear wall 48 thereon to act as a stop for the slidable finish finger 49.

Interposed between the stationary offset-finish finger 42 and the stationary container-locating finger 45 is a slidable finish finger 49 which has a rear wall 50 depending therefrom and a front feeler 51 to engage the finish F of the container on the side opposite to the side engaged by the container-locating feeler 47 to inspect the container finish. Interposed between rear wall 48 of the stationary finish finger 45 and the rear wall 50 of slidable finish finger 49 is a first spring 52 and interposed between the rear wall 40 of the gauging finger carrier 32 and rear wall 50 of slidable finish finger 49 is a second spring 53. These springs 52 and 53 are adapted to urge the slidable finish finger 49 forward until its feeler 51 engages the container finish F. If the container finish is greater or lesser than the permitted tolerances, the feeler 51 will cooperate with locating feeler 47 to slide the slidable finish finger 49 forward or back until it closes a circuit which energizes the solenoid 22 to lower valve 19 and create a vacuum in the pocket 4 which holds the defective container therein until it is to be discarded.

Slidable between the stationary diameter finger 41 and the offset-finish finger 42 is a side wall gauging finger 54 having an upstanding rear wall 55 and a front feeler 56 adapted to engage and gauge the side walls of the container 1. Interposed between the rear wall 40 of the carrier 32 and the rear wall 55 of the side wall finger 54 is a spring 57 which will urge the side wall finger 54 forward until its feeler 56 engages the side walls of the container 1. If the side walls of a container 1 are sunk-in or bulged-out beyond predetermined permissible tolerances, the side wall finger 54 will close a circuit which will energize the solenoid 22 to lower the valve 19 and create a vacuum in pocket 4 which holds the defective container therein until it is to be discarded.

Slidably mounted between the fixed diameter finger 41 and the bottom wall 38 of the carrier 32 is a shut-off control finger 58 which inspects the presence or absence of a container in pocket 4 to permit the gauging unit to operate only when a container is in the pocket 4 and to stop the operation of the gauging unit when no container is present in the pocket 4. The shut-off finger 58 has an upstanding rear wall 59 and a curved front feeler 60 at its front to engage a container 1 when the container is in the pocket 4. Interposed between the rear wall 40 of the carrier 32 and the rear wall 59 of the shut-off finger 58 is a spring 61 which is adapted to urge the shut-off finger 58 forward until its feeler 60 engages the container 1. If there is no container in the pocket 4, it will open the circuit of the solenoid 22 to stop its operation.

In order to energize the solenoid 22 when a defective container is in the pocket 4 of pocket wheel 2, the side wall 37 has an electrical pin board 62 extending upwardly therefrom and provided with a plurality of electrical contact pins 63 through 72, which are electrically connected together in series, as shown by the broken line in FIG. 2. Movable between these contact pins are a plurality of levers 75 to 79 which are electrically connected to one terminal of the solenoid 22 by means of lead 24 and which are pivotally mounted on the gauging fingers in a manner to be pointed out below. The other terminal of solenoid 22 is connected to a source of power (not shown) by lead 74a. The pin board 62 is provided with contact pin 73, in series with contact pins 63 to 72, and a shut-off lever 80, described in greater detail below, is provided which is normally in contact with contact pin 73 and is electrically connected to the power source. When any of the gauging fingers are moved by a defective container beyond the permissible distances, it will move its respective lever 75 to 79 into engagement with one of contact pins 63 to 72 to close the circuit through lead 74a, solenoid 22, lead 24, the particular lever 75 to 79 which was moved, the particular contact pin 63 to 72 which came into engagement with the particular lever moved, contact pin 73, shut-off lever 80 in contact with pin 73 and lead 74 to energize the solenoid 22 to lower the valve 19 and create a vacuum which will retain a defective container in the pocket 4 of the pocket wheel 2 until it is to be ejected into the receptacle 9.

Referring more particularly to FIG. 2, the height lever 75 is a two-armed crank lever pivotally mounted between side walls 36 and 37 on pivot 81. Its vertical arm 75a extends through opening 82 in top wall 39 of carrier 32 to lie between contact pins 63 and 64 and its horizontal arm lies on the top of the container rim R to gauge the height of the container 1. If the container is either too low or too high, the lever 75 will turn on its pivot 81 to swing its upstanding leg 75a into contact with either contact pin 63 or contact pin 64. This will close the circuit and energize solenoid 22 to lower the valve 19 and thereby create a vacuum in the pocket 4 which retains the rejected container 1 therein until it is to be ejected.

Lever 76 is adapted to energize the solenoid 22 when the finish of the container 1 is defective. The lever 76 is anchored in the opening 83 in slidable finish finger 49 at 84 and is pivoted in the opening 85 of the container-locating finger 45 at 86. The lever 76 extends through opening 87 in top wall 39 to lie between contact pins 65 and 66 so that when the finish F of a container 1 is defective, the feeler 51 of the slidable finish finger 49 will move in one direction or another, thereby pivoting finish lever 76 on pivot 86 into engagement with contact pin 65 or contact pin 66. This will close the circuit which energizes the solenoid 22 to thereby lower valve 19 and create the container retaining vacuum in the pocket 4.

Lever 77 is adapted to gauge the radial distance between the finish and the side walls of the container, and for convenience, will hereafter be called the offset-finish lever. Offset-finish lever 77 is anchored on a lever support member 88 at 89 and is pivotally mounted in the opening 83 in slidable finish finger 49 at 90. The lever support member 88 is anchored at 91 in the opening 92 of bottom of the carrier holder 30 of the unit 5 and extends upwardly through opening 93 in bottom wall 38, opening 94 in shut-off finger 58, and openings 95 and 96 in fingers 41 and 54, respectively. The lever support member 88 is pivotally mounted at 97 in the opening 98 of the stationary offset-finish finger 49. The offset-finish lever 77 extends upwardly through opening 99 in top wall 39 to lie between contact pins 67 and 68. When the radial distance between the finish and side walls of the container is either too large or too small, the finish finger 49 will move in or out relative to stationary diameter finger 42, thereby swinging offset-finish lever 77 into engagement with contact pin 67 or contact pin 68. This closes the circuit and energizes the solenoid 22.

The lever 78 is adapted to energize the solenoid 22 when side walls of the container either bulge-out or are sunken-in beyond permissible tolerances. Side wall lever 78 is anchored on the slidable side wall finger 54 at 100 and is pivotally mounted on the stationary diameter finger 42 at 101. The side wall lever 78 extends upwardly through openings 98, 83, and 85 in fingers 42, 49 and 45, respectively, and through opening 102 in top wall 39 to lie between contacts 69 and 70. When the side walls of the container 1 are bulged-out or sunken-in for more than the permissible tolerances, the side wall finger 54 will move inwardly or outwardly to swing lever 78 on its pivot 101 into engagement with the contact pin 69 or contact pin 70. This closes the circuit and energizes the solenoid 22.

The lever 79 is adapted to energize the solenoid 22 when the diameter of the container is either beyond or below the permissible tolerances. The diameter lever 79 is anchored in the opening 103 in stationary base 30 at 104 and is pivoted on stationary diameter finger 42 at 105. The diameter lever 79 extends upwardly through openings 94 in bottom 38 and through openings 95, 96, 98, 83, and 85 in fingers 58, 41, 54, 42, 49, and 45 respectively. The diameter lever 79 extends through opening 106 in the top wall 39 to lie between contact pins 71 and 72. When the diameter of a container 1 is too small or too large, the carrier 32 will be moved toward or away from the container under the spring 35. In its movement, the carrier 32 carries with it stationary diameter feeler 42, thus permitting the diameter lever 79 to swing on pivot 105 and to engage either the contact pin 71 or contact pin 72. This closes the circuit and energizes the solenoid 22.

In order to prevent the container rejection mechanism from operating when no container is present in the pocket 4, the shut-off lever 80 is provided which is normally in engagement with the contact pin 73 when a container is in pocket 4 to maintain the circuit with the solenoid 22 closed. The shut-off lever 80 is anchored on the shut-off finger 58 at 107 and is pivotally mounted on the offset-finish finger 142 at 108. The lever 80 extends through opening 109 to engage contact pin 73. When a pocket without a container is presented to the gauging unit 5, the shut-off feeler 58 will slide toward the pocket wheel 2 under the influence of the spring 61 to thereby swing the shut-off lever 80 around its pivot 108 away from the contact pin 73 and out of engagement therewith. This will open the solenoid circuit and prevent the solenoid 22 from being energized until the lever 80 again comes into engagement with contact pin 73. The circuit will remain open until a pocket with a container therein is presented to the gauging unit 5 at which time the shut-off finger 58 will slide inwardly and thereby place the lever 80 into engagement with the contact pin 73 to close the solenoid circuit.

*Operation*

Referring more particularly to FIG. 1, the containers 1 are fed one-by-one to the pockets 4 of rotating pocket wheel 2 by a conveyor 3. The containers are moved past the three gauging units 5 by the pocket wheel 2 to be gauged thereby. The containers 1 are then rotated and are engaged by the feelers 60, 43, 56, 44, 51, and 75b of the gauging units 5. Since a container 1 will make one third of a turn in passing a single gauging unit 5, three gauging units are provided so that the full diameter of each container may be gauged.

When a container 1 is presented to a gauging unit, the gauging finger carrier 32 will be moved by spring 35 toward the container to thus place stationary offset-finish feeler 44 into engagement with one side of the container and slidable container-locating feeler 47 into engagement with the finish of the container on the opposite side thereof to thus properly locate the container 1. At the same time the height feeler 75b rests on the top of the container rim to inspect its height and the feelers 43, 51, 56, and 44 engage the container to gauge its diameter, finish, sunken side walls, and offset-finish. If the dimensions of the container 1 are within the permissible tolerances, the gauging fingers will not be moved to such an extent as to move the levers 75 to 79 into engagement with the contact pins 63 to 72 so that the solenoid circuit is not closed and the solenoid 22 is not energized. Hence, no vacuum is created in the pocket 4 of the pocket wheel 2 and the container will be moved by the pocket wheel 2 on to the take-off conveyor 8 (FIG. 1).

However, if a container is defective, the fingers will be moved to such an extent as to place their respective feelers 75 to 79 into engagement with their respective contact pins 63 to 72 to close the circuit and energize the solenoid 22. When solenoid 22 is energized, its armature 23 will be thrust outwardly to thereby lower the valve 19 and place its reduced neck 20 in the path of the pressure conduit 12. This permits air to be removed from between the washer seals 13 of the pocket 4 to thereby create a vacuum which holds the defective container 1 in the pocket 4. The defective container is thus held so that it will not be deposited on the take-off conveyor 8 but will be moved beyond it until it reaches the discard receptacle 9. At this point the cam 26 comes into contact with the valve 19 and raises it to thereby break the vacuum and to release the container 1 which thereafter falls out of the pocket 4 and into receptacle 9.

In order to prevent the solenoid 22 from being energized when a pocket 4 having no container therein is presented to a gauging unit 5, the slidable shut-off finger 60 is in engagement with the container. If no container is in a pocket, the shut-off finger 60 will move toward the pocket wheel 2 until its shut-off lever 80 is out of engagement with contact pin 73. This opens the solenoid circuit and prevents it from being closed even though the remaining fingers come into engagement with the remaining contact pins. The circuit will remain open until a pocket 4 with a container is presented to the gauging unit 5 which will slide the shut-off finger 58 inwardly until the lever 80 is placed into engagement with the contact pin 73 to close the circuit.

It will be seen from the above that the present invention provides a gauging apparatus which will automatically gauge containers for its defects, which will automatically reject defective containers, which is compact and simple to operate, and which is simple and inexpensive to manufacture.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In an article gauging machine, the combination of a pocket wheel having a plurality of pockets for receiving articles therein and a gauging unit for gauging a portion of said articles, said gauging unit being comprised of a slidable feeler carrier having a plurality of fixed gauging fingers and a plurality of slidable gauging fingers therein slidable relative to said fixed gauging fingers, means for rotating said pocket wheel relative to said gauging unit to permit the articles therein to be placed into engagement with the gauging fingers to be gauged thereby, an air pressure conduit in said pocket wheel communicating with its pockets adapted to create a vacuum in said pockets to retain a defective container therein to carry it past the point of delivery of commercial articles, a vertically movable control valve mounted in said pocket wheel and intersecting said air pressure conduit, said air control valve having a reduced portion therein, a solenoid having its armature located above said air control valve, a plurality of pairs of electrical contact pins on said inspecting unit electrically connected to said solenoid, a plurality of levers pivotally mounted on said gauging fingers, said levers extending between each pair of electrical contact pins and being electrically connected to said solenoid, said levers being adapted to be pivoted by movement of said gauging fingers to come into engagement with said contact pins to energize said solenoid, whereby energization of said solenoid will permit its armature to move said air control valve, thereby placing its reduced portion in the path of said air pressure conduit to create a vacuum in said pocket which retains a defective container therein, and a cam below said pocket wheel adapted to be engaged by said air control valve to move its reduced portion out of the path of the air pressure conduit to thereby break the vacuum and permit the defective container to drop out of the pocket after it passes said point of delivery.

2. In an article gauging machine, the combination of means for holding an article to be gauged, means for gauging a portion of said article, said gauging means comprising a slidable carrier having a plurality of gauging fingers fixedly mounted thereon and a plurality of gauging fingers slidable relative thereto, means for relatively moving said article-holding means and said gauging means to place an article into engagement with said gauging fingers to be gauged thereby, means for creating a vacuum in article-holding means for retaining a defective article therein to carry it past the point of delivery of commercial articles, said vacuum-creating means being operable by said gauging fingers, and means for shutting off the vacuum in said article-holding means to permit said defective article to be ejected therefrom after it has passed said point of delivery.

3. An article gauging machine as claimed in claim 2 wherein the means for operating said vacuum-creating means are electrical means and wherein said gauging fingers are provided with means for energizing said electrical means.

4. An article gauging machine as claimed in claim 3 wherein said energizing means comprises levers pivotally mounted thereon and wherein said electrical means include electrical contacts adjacent said levers, whereby a defective article will move said gauging fingers to place said levers into engagement with said electrical contacts to energize said electrical means for operating said vacuum-creating means.

5. An article gauging machine as claimed in claim 4 wherein said electrical contacts are comprised of a plurality of electrical contact pins mounted on said carrier and wherein said levers extend between said contact pins.

6. In an article gauging machine, the combination of means for holding an article to ge gauged, means for gauging a portion of said article, means for moving said article-holding means and said gauging means relative to each other in a continuous motion to place an article into frictional contact with said gauging means to rotate the article while in engagement with and while moving relative to said gauging means, means operable by said gauging means for positively gripping and holding a defective article in said article-holding means, and means for ejecting said defective article from said article-holding means.

7. In an article gauging machine, the combination of means for holding an article to be gauged, said article-holding means comprising a pocket wheel having pockets adapted to hold articles therein, means for gauging a portion of said articles, means for continuously rotating said pocket wheel relative to said gauging means to present said article into frictional engagement with said gauging means to rotate the article while in engagement with and while moving relative to said gauging means, means operable by said gauging means for positively holding said defective article in the pocket of said pocket wheel to carry it past the point of delivery of commercial articles, and means for ejecting said defective article from said pocket after is passes said point of delivery.

8. In an article gauging machine, the combination of a pocket wheel having pockets adapted to receive and hold an article therein, means for gauging a portion of said articles, means for continuously rotating said pocket wheel relative to said gauging means to present said articles into frictional engagement with said gauging means to rotate the article while in engagement with and while moving relative to said gauging means, means operable by said gauging means on said pocket wheel for creating a vacuum in said pockets to retain a defective container therein to carry it past the point of delivery.

9. In a gauging machine as claimed in claim 8, wherein said gauging means comprises a holder, a plurality of slidable gauging fingers in vertical relation to each other slidably mounted on said holder and adapted to engage said articles, a pair of electrical contacts on said gauging means, a lever pivotally mounted on said slidable gauging fingers, said lever extending between said pair of electrical contacts, whereby a defective article will move said fingers a sufficient distance to place said lever into engagement with one of said contacts to operate said means for creating a vacuum.

10. An article gauging machine as claimed in claim 9 wherein said vacuum-creating means comprises a pressure conduit in said pocket wheel communicating with said pocket.

11. An article gauging machine as claimed in claim 10 wherein said vacuum-creating and shut-off means comprises a valve movably mounted in said pocket wheel intersecting said air pressure conduit to control the pressure in said pocket, said valve having a reduced portion therein whereby moving said valve to its operative position will place its reduced portion in the path of said air pressure conduit to create a vacuum in said pocket and moving the valve to its inoperative position will remove its reduced portion from the path of said air pressure conduit to break the vacuum.

12. An article gauging machine as claimed in claim 11 wherein said valve is moved to its operative position by a solenoid adapted to be energized by said gauging means, and wherein said valve is moved to its inoperative position by a cam on the apparatus.

13. In an article gauging machine, the combination of means for holding an article to be gauged, means for gauging a portion of said article, said gauging means comprising a holder, a gauging finger mounted for movement on said holder, means for moving said article-holding means and said gauging means relative to each other in a continuous motion to place the article into frictional engagement with said gauging finger to rotate the article while in engagement with and while moving past said gauging finger, means operable by said gauging finger for positively gripping and holding a defective article in said article-holding means, and means for ejecting said defective article from said article-holding means.

14. In an article gauging machine, the combination of means for holding an article to be gauged, means for gauging a portion of said article, said gauging means comprising a holder, a plurality of gauging fingers mounted for movement on said holder, means for moving said article-holding means and said gauging means relative to each other in a continuous motion to place an article into frictional engagement with said gauging fingers to rotate the article while in engagement with and while moving relative to said gauging fingers, means operable by said gauging fingers for positively gripping and holding a defective article in said article-holding means, and means for ejecting said defective article from said article-holding means.

15. In an article gauging machine, the combination of means for holding an article to be gauged, means for gauging a portion of said article, said gauging means comprising a holder, a plurality of gauging fingers mounted for movement on said holder, means for moving said article-holding means and said gauging means in a continuous motion relative to each other to place an article into frictional engagement with said gauging fingers to rotate the article while in engagement and while being rotated relative to said gauging fingers, means operable by said gauging fingers for creating a vacuum in an article-holding means for retaining a defective article therein to carry it past the point of delivery of commercial articles, and means for breaking the vacuum in said article-holding means to permit said defective article to be ejected therefrom after it passes said point of delivery.

References Cited in the file of this patent

UNITED STATES PATENTS

| | | |
|---|---|---|
| 1,495,460 | Thompson | May 27, 1924 |
| 1,520,020 | Flaherty | Dec. 23, 1924 |
| 1,580,955 | Burdick | Apr. 13, 1926 |
| 2,352,091 | Fedorchak et al. | June 20, 1944 |
| 2,407,062 | Darrah | Sept. 3, 1946 |
| 2,542,090 | Lorenz | Feb. 20, 1951 |
| 2,682,802 | Fedorchak et al. | July 6, 1954 |
| 2,700,465 | Pechy et al. | Jan. 25, 1955 |
| 2,800,226 | Drennan | July 23, 1957 |